United States Patent
Ueberschaer et al.

(10) Patent No.: US 12,459,401 B2
(45) Date of Patent: Nov. 4, 2025

(54) AIRCRAFT PASSENGER SERVICE UNIT, AIRCRAFT PASSENGER SERVICE UNIT ASSEMBLY, AND METHOD OF DETERMINING SPATIAL POSITIONS AND/OR ORIENTATIONS OF A PLURALITY OF AIRCRAFT PASSENGER SERVICE UNITS

(71) Applicant: Goodrich Lighting Systems Gmbh & Co. KG, Lippstadt (DE)

(72) Inventors: Andreas Ueberschaer, Guetersloh (DE); Andre Hessling-Von Heimendahl, Koblenz (DE); Carsten Pawliczek, Lippstadt (DE); Marion Depta, Lippstadt (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 209 days.

(21) Appl. No.: 18/319,822

(22) Filed: May 18, 2023

(65) Prior Publication Data
US 2023/0412214 A1    Dec. 21, 2023

(30) Foreign Application Priority Data

May 20, 2022 (EP) .................................. 22174553
May 20, 2022 (EP) .................................. 22174554

(51) Int. Cl.
*H04B 5/00*    (2024.01)
*B60N 2/00*    (2006.01)
(Continued)

(52) U.S. Cl.
CPC ............. *B60N 2/002* (2013.01); *B64D 11/00* (2013.01); *B64D 45/00* (2013.01); *G01S 1/0423* (2019.08);
(Continued)

(58) Field of Classification Search
CPC ......... B60N 2/002; G01S 1/7034; G01S 1/68; G01S 1/0423; H04B 5/72; B64D 11/00;
(Continued)

(56) References Cited

U.S. PATENT DOCUMENTS 8,325,023 B2    12/2012   Kohlmeier-Beckmann et al.
10,003,829 B2    6/2018   Ibrahim et al.
(Continued)

FOREIGN PATENT DOCUMENTS

CA    3102737 A1 *    6/2021   ............... B60Q 3/43
EP    3712065 A1 *    9/2020   ............... B60Q 3/43
(Continued)

OTHER PUBLICATIONS

Extended European Search Report for Application No. 22174553.2, mailed Nov. 9, 2022, 11 pages.
(Continued)

*Primary Examiner* — Tuan C To
(74) *Attorney, Agent, or Firm* — CANTOR COLBURN LLP

(57) ABSTRACT

An aircraft passenger service unit, which is configured for being installed in a passenger cabin of an aircraft. The unit includes at least two near field communication interfaces, wherein each of the at least two near field communication interfaces is configured for a wireless exchange of messages with a corresponding near field communication interface of a neighboring aircraft passenger service unit. The messages include information that identifies the aircraft passenger service unit and the near field communication interface sending the respective message.

14 Claims, 8 Drawing Sheets

(51) Int. Cl.
- B64D 11/00 (2006.01)
- B64D 45/00 (2006.01)
- G01S 1/04 (2006.01)
- G01S 1/68 (2006.01)
- G01S 1/70 (2006.01)
- H04B 5/72 (2024.01)

(52) U.S. Cl.
CPC .............. *G01S 1/68* (2013.01); *G01S 1/7034* (2019.08); *H04B 5/72* (2024.01); *B64D 2011/0053* (2013.01); *B64D 2231/00* (2013.01)

(58) Field of Classification Search
CPC ............ B64D 45/00; B64D 2011/0053; B64D 2231/00; G08B 21/22; G08B 21/24
USPC ......................................................... 701/450
See application file for complete search history.

(56) References Cited

U.S. PATENT DOCUMENTS

| | | | |
|---|---|---|---|
| 10,346,657 | B1 | 7/2019 | White et al. |
| 10,579,521 | B2 | 3/2020 | Trunk et al. |
| 10,680,675 | B1 * | 6/2020 | Callahan ................ H04B 3/544 |
| 10,850,852 | B2 | 12/2020 | Movsesian et al. |
| 11,392,815 | B1 * | 7/2022 | Huijsing ............... B64D 11/003 |
| 2008/0186721 | A1 * | 8/2008 | Vogel ....................... B60Q 3/47 |
| | | | 345/694 |
| 2010/0012780 | A1 | 1/2010 | Kohlmeier-Beckmann et al. |
| 2016/0347453 | A1 * | 12/2016 | Jha ........................... F21V 5/045 |
| 2020/0096599 | A1 | 3/2020 | Hewett et al. |
| 2021/0122290 | A1 | 4/2021 | Jha et al. |
| 2021/0182447 | A1 | 6/2021 | Whang et al. |
| 2022/0324398 | A1 * | 10/2022 | Lauwereins ....... B64D 11/0015 |
| 2023/0373352 | A1 | 11/2023 | Ueberschaer et al. |
| 2024/0159856 | A1 | 5/2024 | Walk |

FOREIGN PATENT DOCUMENTS

| | | | | |
|---|---|---|---|---|
| EP | 3718893 A1 | 10/2020 | | |
| EP | 3792140 A1 | 3/2021 | | |
| GB | 2430118 A | * | 3/2007 | ......... B64D 11/0015 |

OTHER PUBLICATIONS

Extended European Search Report for Application No. 22174554.0, mailed Nov. 9, 2022, 16 pages.

Riedlinger M., et al. "An adaptive self-managing platform for cabin management systems", CEAS Aeronautical Journal, Springer Vienna, Vienna, vol. 7, No. 3, Jul. 23, 2016 (Jul. 23, 2016), pp. 483-498.

\* cited by examiner

AIRCRAFT PASSENGER SERVICE UNIT, AIRCRAFT PASSENGER SERVICE UNIT ASSEMBLY, AND METHOD OF DETERMINING SPATIAL POSITIONS AND/OR ORIENTATIONS OF A PLURALITY OF AIRCRAFT PASSENGER SERVICE UNITS

CROSS-REFERENCE TO RELATED APPLICATIONS

This application claims priority to European Patent Application No. 22174553.2 and European Patent Application No. 22174554.0 both filed May 20, 2022, the entire contents of which are incorporated herein by reference.

TECHNICAL FIELD

The present invention is related to a aircraft passenger service unit ("PSU"), to an aircraft passenger service unit assembly comprising a plurality of aircraft passenger service units, and to a method of determining spatial positions and/or orientations of a plurality of aircraft passenger service units. The present invention is also related to an aircraft comprising at least one aircraft passenger service unit.

BACKGROUND

Passenger aircraft, such as commercial air planes, which comprise a passenger cabin with passenger seats, are usually equipped with aircraft overhead passenger service units, which are arranged above the passenger seats. Such aircraft overhead passenger service units may comprise individually switchable passenger reading lights, air gaspers for supplying fresh air to the passengers, loudspeakers, and switchable visual signs. The aircraft overhead passenger service units may further comprise oxygen masks, which may be released and activated for supplying an oxygen rich gas to the passengers in emergency situations, in particular in emergency situations which result in a loss of air pressure within the aircraft passenger cabin.

In order to provide the desired functionalities to the passengers, the passenger service units and their functional components are arranged at expedient positions with respect to the associated passenger seats. The positions of the passenger service units and/or the configurations of the operated components of the passenger service units are commonly adjusted, when the seat configuration/seat map is modified and the positions of the passenger seats within the aircraft passenger cabin are changed. Manually changing the positions and/or the configurations of the passenger service units within the aircraft passenger cabin is a cumbersome and time consuming task, which adds additional burden to the modification of the seat configuration/seat map.

It would therefore be beneficial to provide an aircraft overhead passenger service unit that contributes to an easier and more convenient switching between different seat configurations/seat maps within a passenger cabin of an aircraft.

SUMMARY

According to an exemplary embodiment of the invention, an aircraft passenger service unit, which is configured for being installed in a passenger cabin of an aircraft, comprises at least two near field communication interfaces. Each of the at least two near field communication interfaces is configured for a wireless exchange of messages with a corresponding near field communication interface of a neighboring aircraft passenger service unit. The messages, which are exchanged between-aircraft passenger service units, may in particular include information that identifies the aircraft passenger service unit and the near field communication interface sending the respective message.

With an aircraft passenger service unit according to an exemplary embodiment of the invention, the positions and orientations of neighboring aircraft passenger service units may be determined in an automated manner by the communication between neighboring aircraft passenger service units. This may allow for an automated re-configuring of the aircraft passenger service units within the passenger cabin of an aircraft, after the configuration of the aircraft passenger service units and/or the seat configuration within the passenger cabin have been changed. In consequence, the cumbersome and time consuming task of manually changing configurations of the passenger service units within the aircraft passenger cabin may be avoided.

In the context of the present application, "near field communication" may mean that the range of the data transmission via the near field communication interfaces is limited to distances that may be commonly encountered between neighboring aircraft passenger service units in an aircraft cabin. In most use cases, the neighboring aircraft passenger service units are in close proximity to each other, so that the communication range of the near field communication interfaces may be chosen to not substantially exceed the dimensions of the aircraft passenger service unit. In order to provide for a safety margin in the communication capabilities of the near field communication interfaces, the communication range may be higher, such as between 5 and 20 times the dimensions of the aircraft passenger service unit. It is understood that the given values are exemplary only.

The near field communication interfaces may in particular be configured so that they allow for a wireless exchange of message with a corresponding near field communication interface of an adjacent aircraft passenger service unit, which faces the respective near field communication interface.

The near field communication interfaces may further be configured so that the maximum range of the wireless data transmission in not large enough for exchanging messages with aircraft passenger service units, which are arranged in a larger distance, and/or exchanging messages with a communication interface of an adjacent aircraft passenger service unit that is located at an opposing end portion, i.e. a communication interface which faces away from the respective near field communication interface.

The aircraft passenger service unit may in particular be configured to transmit messages which identify not only the aircraft passenger service unit sending the respective message, but which further identify the particular one of the at least two near field communication interfaces of the aircraft passenger service unit, which is employed for sending the respective message.

The aircraft passenger service unit is further configured to receive messages which identify the neighboring aircraft passenger service unit, sending the respective message, and which further identify the particular one of the at least two near field communication interfaces of the neighboring aircraft passenger service unit, which is employed for sending the respective message.

In consequence, after receiving at least one message from a neighboring aircraft passenger service unit, the receiving aircraft passenger service unit is able to use the information, which is comprised in the at least one message, not only for determining the neighboring aircraft passenger service unit sending the respective message, but also for determining the orientation of said sending neighboring aircraft passenger service unit with respect to the receiving aircraft passenger service unit.

Extracting and combining the information comprised in a plurality of messages, which are received by a plurality of aircraft passenger service units within a passenger cabin, may allow for generating a virtual map, which is a "digital twin" of the spatial arrangement of the plurality of aircraft passenger service units within the passenger cabin. Said virtual map may in particular indicate the spatial positions and/or the spatial orientations of the plurality of aircraft passenger service units with respect to each other and/or with respect to the passenger seats and/or with respect to certain landmarks within the passenger cabin.

The information, which is comprised in such a virtual map, may be used for adapting the plurality of aircraft passenger service units to a seat configuration within the passenger cabin, in particular after the seat configuration within the passenger cabin has been changed. This may allow for adapting the configuration of the aircraft passenger service units within the passenger cabin of an aircraft to a new seat configuration in a fast and easy manner, in particular without human intervention.

In an embodiment, the aircraft passenger service unit further comprises at least one personal reading light, at least one air gasper and/or at least one oxygen mask.

The aircraft passenger service unit may be configured to adapt an operation of the at least one personal reading light and/or an operation of the at least one air gasper and/or a deployment of the at least one oxygen mask in accordance with a current configuration of aircraft passenger service units within the passenger cabin. The operation may in particular be adapted in accordance with the position and/or orientation of the aircraft passenger service unit with respect to at least one passenger seat.

In an embodiment, the virtual map includes a spreadsheet or other data structure having a plurality of entries, wherein the entries indicate, for each of the aircraft passenger service units, the neighboring aircraft passenger service unit(s) and the respective orientations of the aircraft passenger service units with respect to each other. A spreadsheet provides a suitable means for storing data, which represents the current configuration of the aircraft passenger service units within the passenger cabin.

Other data structures than spreadsheets may be employed for storing the virtual map. The virtual map may, for example, be stored as a dynamically linked list, which stores the information about the neighbors and their respective orientations for each of the aircraft passenger service units.

In an embodiment, two of the at least two near field communication interfaces are provided at opposing end portions of the aircraft passenger service unit. A first near field communication interface may in particular be provided at a first end portion of the aircraft passenger service unit, and a second near field communication interface may in particular be provided at an opposing second end portion of the aircraft passenger service unit. The first end portion may be a front end portion of the aircraft passenger service unit, and the second end portion may by a rear end portion of the aircraft passenger service unit, or vice versa.

Such a configuration of the near field communication interfaces may allow for determining the spatial orientation of the aircraft passenger service unit based on the information which of the two near field communication interfaces is capable to communicate with a neighboring aircraft passenger service unit. Since the operational range of the near field communication interfaces may be spatially limited, e.g. via the design of the near field communication interface itself and/or via suitable shielding, usually only two near field communication interfaces, which are arranged very close to each other and which are facing each other, are capable to communicate with each other via the near field communication interfaces.

In an embodiment, the at least two near field communication interfaces are configured for optical data transmission. The at least two near field communication interfaces may in particular be configured for transmitting data using visible light and/or infrared light. Two neighboring near field communication interfaces may in particular form an optocoupler, which is capable to transfer messages between the two near field communication interfaces.

Optical data transmission may be configured such that it is highly directionally sensitive and that it has a very limited spatial range of operation. A high directional sensitivity and a limited spatial range of operation both are desirable for restricting the near field communication to the communication between two near field communication interfaces, which are arranged adjacent to and facing each other. Such a set-up may further allow for preventing the interference of said near filed communication by the emissions of other communication interfaces, which are arranged in larger distances from the two neighboring aircraft passenger service units, communicating with each other.

In an embodiment, the at least two near field communication interfaces are configured for radio frequency data transmission, e.g. for exchanging messages via electromagnetic waves having frequencies in the range of between 1 MHz and 100 MHz, more particularly in a range of between 10 MHz and 20 MHz. Radio frequency data transmission provides a well suited means for wireless data transmission. The given frequencies have been found to be well-suited for the near field communication between closely arranged aircraft passenger service units.

In an embodiment, the aircraft passenger service unit further comprises a master communication interface, which allows the aircraft passenger service unit to communicate with a master controller. This may allow the master controller to collect and combine data, which is received from a plurality of aircraft passenger service units, for determining the current configuration, e.g. the number, the positions and the orientations, of the aircraft passenger service units, which are present within the passenger cabin of an aircraft.

In an embodiment, the master communication interface is configured for wireless communication, for example for wireless communication employing a WLAN oder Bluetooth® protocol. The master communication interface may be configured for wireless communication using electromagnetic radiation having frequencies in the range of between 1 GHz and 20 GHz, more particularly in a range of between 2 GHz and 11 GHz.

In an embodiment, the master communication interface is configured for wired communication. The master communication interface may in particular be configured for allowing the aircraft passenger service unit to communicate with the master controller via a bus that allows for coupling a plurality of aircraft passenger service units to the master controller. Employing a bus that allows a plurality of aircraft passenger service units to communicate with the master controller may reduce the wiring for coupling all aircraft passenger service units to the master controller.

Exemplary embodiments of the invention further include an aircraft passenger service unit assembly, which comprises a plurality of aircraft passenger service units according to exemplary embodiments of the invention. The aircraft passenger service units may be configured for communicating with each other via a wired data connection or via a wireless data connection.

The aircraft passenger service unit assembly may further comprise a master controller. Each of the plurality of aircraft passenger service units may be coupled to the master controller via its master communication interface. The master controller may in particular be coupled with the plurality of aircraft passenger service units via a bus.

Exemplary embodiments of the invention further include a method of determining spatial positions and/or orientations of a plurality of aircraft passenger service units in a passenger cabin of an aircraft, wherein each of the plurality of aircraft passenger service units comprises at least two near field communication interfaces, and wherein the method includes that: neighboring aircraft passenger service units exchange messages with each other in a wireless manner via their respective near field communication interfaces, wherein the messages include information that identifies the aircraft passenger service unit and the near field communication interface sending the respective message; each of the plurality of aircraft passenger service units transmits identification information about itself and identification information about its neighboring aircraft passenger service units to a master controller; and the master controller processes said identification information, which the master controller received from the plurality of aircraft passenger service units, for generating a virtual map of the arrangement of the aircraft passenger service units, wherein the virtual map indicates the spatial positions and/or orientations of the plurality of aircraft passenger service units with respect to each other.

In an embodiment, at least a subset of the plurality of aircraft passenger service units are arranged adjacent to each other in a continuous chain and/or wherein respective subsets of the plurality of aircraft passenger service units are arranged adjacent to each other in a plurality of continuous chains; and the method further includes that the master controller, pursuant to receiving additional high level arrangement information, determines a spatial position of at least one continuous chain of aircraft passenger service units within the passenger cabin of the aircraft and/or determines spatial positions and/or orientations of at least two continuous chains of aircraft passenger service units with respect to each other.

In an embodiment, the method further includes that each of the plurality of aircraft passenger service units determines a position and/or orientation of at least one passenger seat, which is located in the vicinity of, in particular below, the respective aircraft passenger service unit, and that each of the plurality of aircraft passenger service units transmits passenger seat information about said position and/or orientation of said at least one passenger seat to the master controller.

In an embodiment, the method further includes that the master controller processes said passenger seat information, received from the plurality of aircraft passenger service units, for generating a virtual seat map, and that the master controller controls operating parameters of the plurality of aircraft passenger service units, in particular lighting parameters of the plurality of passenger service units, on the basis of the virtual map of the arrangement of the plurality of aircraft passenger service units and the virtual seat map.

Each of the plurality of aircraft passenger service units of the aircraft passenger service unit assembly may be configured to send identification information about itself and identification information about its respective neighboring aircraft passenger service units to the master controller. The identification information about the respective neighboring aircraft passenger service units may be obtained by exchanging messages with the respective neighboring aircraft passenger service units.

An aircraft passenger service unit, which is part of the aircraft passenger service unit assembly, may in particular be configured to send identification information about two neighboring aircraft passenger service units, if it has two neighbors, in particular one neighbor on each side of the aircraft passenger service unit.

The aircraft passenger service unit may be configured to send identification information about only one neighboring aircraft passenger service unit, if it has only one neighbor. The aircraft passenger service unit may have only one neighbor when it is the first or the last aircraft passenger service unit of a continuous row or chain of aircraft passenger service units.

In an embodiment, the master controller is configured to process the identification information, which it received from the plurality of aircraft passenger service units, for generating a virtual map, which provides a "digital twin" of the spatial arrangement of the plurality of aircraft passenger service units. The virtual map may indicate the spatial positions and/or the spatial orientations of the plurality of aircraft passenger service units with respect to each other.

In an embodiment, the master controller is integrated into one of the aircraft passenger service units. Integrating the master controller into one of the aircraft passenger service units may avoid the need for providing the master controller as a further component in addition to the plurality of aircraft passenger service units.

In an embodiment, the master controller is provided as a separate controller in addition to the aircraft passenger service units. Providing the master controller separately from the aircraft passenger service units may avoid the need of integrating the master controller into at least one of the aircraft passenger service units. In consequence, the complexity and the costs of the aircraft passenger service units may be reduced as compared to a configuration, in which the master controller is integrated into at least one of the aircraft passenger service units.

In an embodiment, at least a subset of the plurality of aircraft passenger service units are arranged adjacent to each other, forming a continuous, i.e. uninterrupted, chain of aircraft passenger service units. In an embodiment, at least two subsets of the plurality of aircraft passenger service units are arranged adjacent to each other forming a plurality of continuous chains of aircraft passenger service units.

The continuous chains of aircraft passenger service units may correspond to and may be associated with corresponding groups of passenger seats within the passenger cabin of an aircraft.

A first chain of aircraft passenger service units may, for example, correspond to a first group of passenger seats, which are arranged on a left side of the passenger cabin. A second chain of aircraft passenger service units may, for example, correspond to a second group of passenger seats, which are arranged in a middle portion of the passenger cabin. A third chain of aircraft passenger service units may, for example, correspond to a third group of passenger seats, which are arranged on a right side of the passenger cabin.

Depending on the configuration of passenger seats with the passenger cabin, the aircraft may comprise less or more than three chains of aircraft passenger service units.

In an embodiment, the master controller is configured to receive additional high level arrangement information. The additional high level arrangement information may allow the master controller to determine a spatial position and/or orientation of at least one continuous row of aircraft passenger service units within the passenger cabin. Alternatively or additionally, the additional high level arrangement information may allow the master controller to determine spatial positions and/or orientations of at least two continuous rows of aircraft passenger service units with respect to each other.

In an embodiment, the master controller is configured for receiving the additional high level arrangement information by manual input, for example by a manual input, which is input by a human operator. The master controller may, in particular, comprise a manual input device, which is configured for receiving the manual input.

The human operator may provide a manual input, comprising the additional high level arrangement information, after the seat configuration and/or the configuration of the aircraft passenger service units within the passenger cabin have been changed, in order to allow the master controller to generate a new virtual map, which represents the new configuration of the aircraft passenger service units within the passenger cabin.

In an embodiment, the aircraft passenger service unit assembly comprises an position determining system, which is configured for determining the spatial position and/or orientation of at least one aircraft passenger service unit in the passenger cabin of the aircraft.

In such an embodiment, the master controller may be configured for receiving the additional high level arrangement information from the position determining system. Providing and using such a position determining system may help the generation of a virtual map, which represents the current configuration of the aircraft passenger service units within the passenger cabin. Employing a position determining system may in particular avoid the need for providing a manual input comprising additional high level arrangement information to the master controller.

In an embodiment, each of the plurality of aircraft passenger service units is configured to determine a position and/or an orientation of at least one passenger seat, which is located in the vicinity of, in particular below, the respective aircraft passenger service unit. Each of the plurality of aircraft passenger service units may in particular be configured to send passenger seat information about said position and/or orientation of said at least one passenger seat to the master controller.

Such an embodiment may allow for adjusting the configuration of each aircraft passenger service unit, in particular the configuration of at least one passenger reading light, at least one air gasper and/or at least one passenger oxygen mask, to the position and/or to the orientation of at least one passenger seat, which is located in the vicinity of the respective aircraft passenger service unit. The configuration of the aircraft passenger service units may be adapted to the current seat configuration within the passenger cabin, in particular to the position and/or of the orientation of the at least one passenger seat with respect to the respective aircraft passenger service unit.

In an embodiment, the aircraft passenger service unit or each of a subset of the aircraft passenger service units or each of the aircraft passenger service units comprises a seat detection sensor, which allows for determining a position and/or an orientation of at least one passenger seat, which is located in the vicinity of, in particular below, the aircraft passenger service unit.

The seat detection sensor may be configured to provide data, which allows an evaluator to determine the position and/or orientation of the at least one passenger seat from said data, potentially in combination with additional data received from one or more other aircraft passenger service unit(s). The evaluator may be integrated with the seat detection sensor, so that the seat detection sensor may execute all steps for determining the position and/or orientation of the at least one passenger seat by itself. In an alternative embodiment, the evaluator may be provided separately from the seat detection sensor. In such an embodiment, the position and/or the orientation of the at least one passenger seat may be determined by the evaluator based on data, which is provided by the seat detection sensor, or based on data, which is provided by the seat detection sensor of the aircraft passenger service unit in question and by one or more other aircraft passenger service unit(s). The evaluator may be implemented in hardware or software or any suitable combination of hardware and software. For example, the evaluator may comprise a microprocessor, and a suitable software program is run on the microprocessor for implementing the evaluation functionality described herein.

The seat detection sensor may in particular be configured for determining the position and/or orientation of the at least one passenger seat relative to the aircraft passenger service unit.

With an aircraft passenger service unit, which comprises a seat detection sensor, the position of at least one passenger seat with respect to the aircraft passenger service unit may be determined automatically without human intervention. This may allow for automatically adjusting the configuration of the aircraft passenger service unit to a current position of the at least one passenger seat relative to the aircraft passenger service unit.

In consequence, it is possible that the configuration of the aircraft passenger service unit does not need to be adjusted manually, when the position of the at least one passenger seat with respect to the aircraft passenger service unit is changed, for example because the seat configuration/seat map within the passenger cabin is changed. As a result, the seat configuration/seat map within the passenger cabin may be changed in a fast and convenient manner.

The aircraft passenger service unit may be configured to adapt an operation of the at least one personal reading light and/or an operation of the at least one air gasper and/or a deployment of the at least one oxygen mask in accordance with the position and/or orientation of the at least one passenger seat, as determined by the at least one seat detection sensor.

Exemplary embodiments of the invention also include a method of adapting an operation of at least one functional component of an aircraft passenger service unit, in particular an operation of a personal reading light and/or an operation of at least one air gasper and/or a deployment of at least one oxygen mask of an aircraft passenger service unit, which is installed in a passenger cabin of an aircraft, wherein the method includes: determining a position and/or an orientation of at least one passenger seat, which is arranged in the vicinity of, in particular below, the aircraft passenger service unit based on information provided by a seat detection sensor of the aircraft passenger service unit; and adapting the operation of the at least one personal functional component and/or the deployment of the at least one oxygen mask in accordance with the position and/or the orientation of the at least one passenger seat.

It may become possible that the operation of the at least one functional component and/or the deployment of the at least one oxygen mask does not need to be adjusted manually, when the position of the at least one passenger seat with respect to the aircraft passenger service unit is changed due to changing the seat configuration/seat map within the passenger cabin. As a result, the seat configuration/seat map within the passenger cabin may be changed in a fast and convenient manner.

In an embodiment, the seat detection sensor is configured for detecting electromagnetic radiation. The electromagnetic radiation may be in the range of visible light, in the range of infrared light or in the range of radio frequencies. The electromagnetic radiation in the radio frequency range may in particular be in a range of between 1 GHz and 20 GHz, more particularly in a range of between 2 GHz and 11 GHz. For the radio frequency transmission, ultra wide band radio technologies may be employed.

In an embodiment, the seat detection sensor comprises an optical sensor, which is configured for detecting visible light and/or infrared light and for providing image information data about the area below the aircraft passenger service unit. The aircraft passenger service unit may further comprise an evaluator, which is configured for identifying at least one passenger seat in the image information data provided by the optical sensor, and for determining the position and/or the orientation of the at least one passenger seat with respect to the aircraft passenger service unit. The evaluator may be integrated with the at least one seat detection sensor, or it may be provided separately from the seat detection sensor.

In an embodiment, the aircraft passenger service unit comprises a light source for illuminating an area below the aircraft passenger service unit with visible light and/or with IR light. This may help to enhance the image information data, which is provided by the optical sensor.

In an embodiment, the seat detection sensor comprises at least one receiver for receiving a radio signal, which is emitted by a radio tag. The radio tag may be located at or within the at least one passenger seat. By combining information, which is provided by a plurality of receivers, which are located at different positions within the passenger cabin, the position of a radio tag and, in consequence, the position of a passenger seat within the passenger cabin may be determined in a particularly accurate manner.

Exemplary embodiments of the invention include a set, comprising an aircraft passenger service unit according to an exemplary embodiment of the invention and at least one radio tag. The at least one radio tag is configured for emitting electromagnetic radiation in the radio frequency range; and the seat detection sensor of the aircraft passenger service unit is configured for detecting the electromagnetic radiation, which is emitted by the at least one radio tag.

In an embodiment, at least two radio tags are provided at each passenger seat or at each row-wise arrangement of passenger seats. By providing at least two radio tags at predefined positions at each passenger seat/at each row-wise arrangement of passenger seats, the position and/or orientation of the passenger seat/of the row-wise arrangement of passenger seats may be determined by relating the derived positions of the at least two radio tags.

The aircraft passenger service unit may comprise a plurality, in particular two or three, radio receivers, wherein each of the plurality of radio receivers is configured for receiving a radio signal, which is emitted by a radio tag. The aircraft passenger service unit may relate the radio signal receptions of the plurality of radio receivers and may determine the position of the radio tag on the basis of the plurality of radio signal receptions. In this way, the aircraft passenger service unit may determine the position of a passenger seat with respect to the aircraft passenger service unit in an autonomous and highly accurate manner. The plurality of radio receivers may be spread out over the aircraft passenger service unit.

Alternatively or additionally, the information from a plurality of radio receivers, which are located in different aircraft passenger service units, may be combined for determining the position of the passenger seat within the passenger cabin.

In order to allow for combining the information, which is provided by a plurality of radio receivers, the aircraft passenger service units may be configured for exchanging information about the radio signal receptions, as received by the radio receivers, with each other.

Each aircraft passenger service unit may be configured for determining the position of a radio tag based on the information provided by its own radio receiver(s) and additional information, which it receives from the radio receiver(s) of at least one other aircraft passenger service unit. In such a configuration, the number of radio receivers, which are provided in each aircraft passenger service unit, may be reduced, as compared to an autonomous implementation of an aircraft passenger service unit. Further, due to the increased distance between radio receivers, which are provided in different aircraft passenger service units, the accuracy of the determined position of the radio tag may be enhanced.

In an embodiment, the aircraft passenger service unit further comprises a trigger signal transmitter for emitting a trigger signal, in particular an electromagnetic trigger signal. When the trigger signal is received by the radio tag, the trigger signal triggers the radio tag to emit a radio signal in response. Said radio signal, which is emitted by the radio tag, may allow the seat detection sensor to determine the position of the radio tag with respect to the aircraft passenger service unit by evaluating the received radio signal.

The trigger signal transmitter may be integrated with the seat detection sensor, or it may be provided separately from the seat detection sensor within the aircraft passenger service unit.

The aircraft passenger service unit may be configured for emitting an individualized trigger signal, and the radio tag may be configured to respond with a radio signal only in response to receiving said individualized trigger signal. In such an embodiment, each of a plurality of radio tags may be triggered individually by sending an individualized trigger signal, which corresponds to the radio tag, which is to be triggered.

Alternatively or additionally, each radio tag may be configured for responding with an individual response signal, which allows the radio receiver to uniquely identify the responding radio tag.

Using individualized trigger signals and/or individual response signals may allow the seat detection sensor to individually identify different radio tags and the corresponding passenger seats in a particularly convenient manner.

Upon receiving the trigger signal, the radio tag may switch from a sleeping mode into an active mode, in which it emits a response signal. The radio tag may switch back into the sleeping mode a predefined time period after receiving the trigger signal. Switching into a sleeping mode may allow for saving power and reducing the amount of electromagnetic radiation within the passenger cabin.

Each radio tag may comprise a local electric power supply, such as a battery or an energy harvesting device. Each radio tag may also be coupled to an electric power supply system of the aircraft.

In an embodiment, the seat detection sensor is configured for determining a time difference between the emission of the electromagnetic trigger signal by the aircraft passenger service unit and the receipt of the response radio signal, which is emitted by the radio tag in response to receiving the electromagnetic trigger signal.

The seat detection sensor may be configured for determining the distance between the radio tag and the seat detection sensor from said time difference. The seat detection sensor may in particular be configured for determining the time differences and the resulting distances for at least three different radio receivers, which are located at three different positions within the passenger cabin. Determining the distances between a radio tag and at least three different radio receivers may allow for unambiguously determining the position of the radio tag within the passenger cabin.

In an embodiment, each radio receiver is configured for determining an amplitude of the radio signal, which it receives from a radio tag. Determining the amplitude of the received radio signal, in particular determining the differences between the amplitudes of the multiple radio signal receptions, which are received by different radio receivers, may allow for determining the distances between the radio tag, sending the radio signal, and the radio receivers, which receive said radio signal. By determining the distances between the radio tag and at least three different radio receivers, which are located at different positions within the passenger cabin, the position of the radio tag with respect to the radio receivers may be unambiguously determined.

In an embodiment, each radio receiver is configured for determining a spatial direction or angle from which it receives the radio signal, which is emitted by the radio tag. By combining the information about the spatial directions or angles of at least two radio receivers, which are located at different positions within the passenger cabin, the position of the radio tag with respect to the radio receivers may be unambiguously determined.

Exemplary embodiments of the invention further include an aircraft passenger service unit assembly, which comprises a plurality of aircraft passenger service units according to exemplary embodiments of the invention. The plurality of aircraft passenger service units may be configured to communicate with each other and to share information, which is gathered by their respective seat detection sensors.

In an embodiment, the method of adapting an operation of at least one personal reading light and/or an operation of at least one air gasper and/or a deployment of at least one oxygen mask of an aircraft passenger service unit includes sharing information about received radio signals with at least one other aircraft passenger service unit and/or receiving information about received radio signals from at least one other aircraft passenger service unit, which comprises a similar seat detection sensor.

The plurality of aircraft passenger service units may be identical. The plurality of aircraft passenger service units may also have a different, but similar design for providing the above mentioned functionalities.

In an embodiment of an aircraft passenger service unit assembly, at least one of the plurality of aircraft passenger service units may be configured to determine a position of a radio tag, which is located at or within the at least one passenger seat, from time differences and/or from phase differences, which are encountered when a radio signal from the radio tag is received by the radio receivers at the respective seat detection sensors of different ones of the plurality of aircraft passenger service units.

In an embodiment of an aircraft passenger service unit assembly, at least one of the plurality of aircraft passenger service units may be configured to determine a position of a radio tag, located at or within the at least one passenger seat, from the amplitudes encountered when a radio signal from the radio tag is received at the respective seat detection sensors of different ones of the plurality of aircraft passenger service units.

In an embodiment of an aircraft passenger service unit assembly, at least one of the plurality of aircraft passenger service units may be configured to determine a position of a radio tag, located at or within the at least one passenger seat, from the angles from where a radio signal from the radio tag is received by the radio receivers at the respective seat detection sensors of different ones of the plurality of aircraft passenger service units.

In an embodiment, the master controller is configured to process the passenger seat information, which it received from the plurality of aircraft passenger service units, for generating a virtual seat map.

The master controller may further be configured to control operating parameters of the plurality of aircraft passenger service units on the basis of the virtual map of the arrangement of the plurality of aircraft passenger service units and the virtual seat map.

The master controller may be configured to control said operating parameters on the basis of the relative positions between the aircraft passenger service units and the passenger seats, which are determined from the virtual map of the arrangement of the plurality of aircraft passenger service units and the virtual seat map.

The operating parameters may include lighting parameters and/or ventilation parameters of the plurality of passenger service units. The operating parameters may further include operating parameters of the oxygen masks of the aircraft passenger service units.

Exemplary embodiments of the invention also include an aircraft, such as an airplane or a helicopter, which comprises a passenger cabin housing a plurality of passenger seats, and an aircraft passenger service unit assembly according to an exemplary embodiments of the invention, wherein the plurality of aircraft passenger service units of the aircraft passenger service unit assembly are installed within the passenger cabin of the aircraft. The additional features, modifications and effects, as described above with respect to the aircraft passenger service unit and/or with respect to the aircraft passenger service unit assembly and/or with respect to the method of determining spatial positions and/or orientations of a plurality of aircraft passenger service units, are applicable to the aircraft in an analogous manner.

BRIEF DESCRIPTION OF THE FIGURES

Further exemplary embodiments of the invention are described below with respect to the accompanying drawings, wherein.

DETAILED DESCRIPTION

Figure 1:
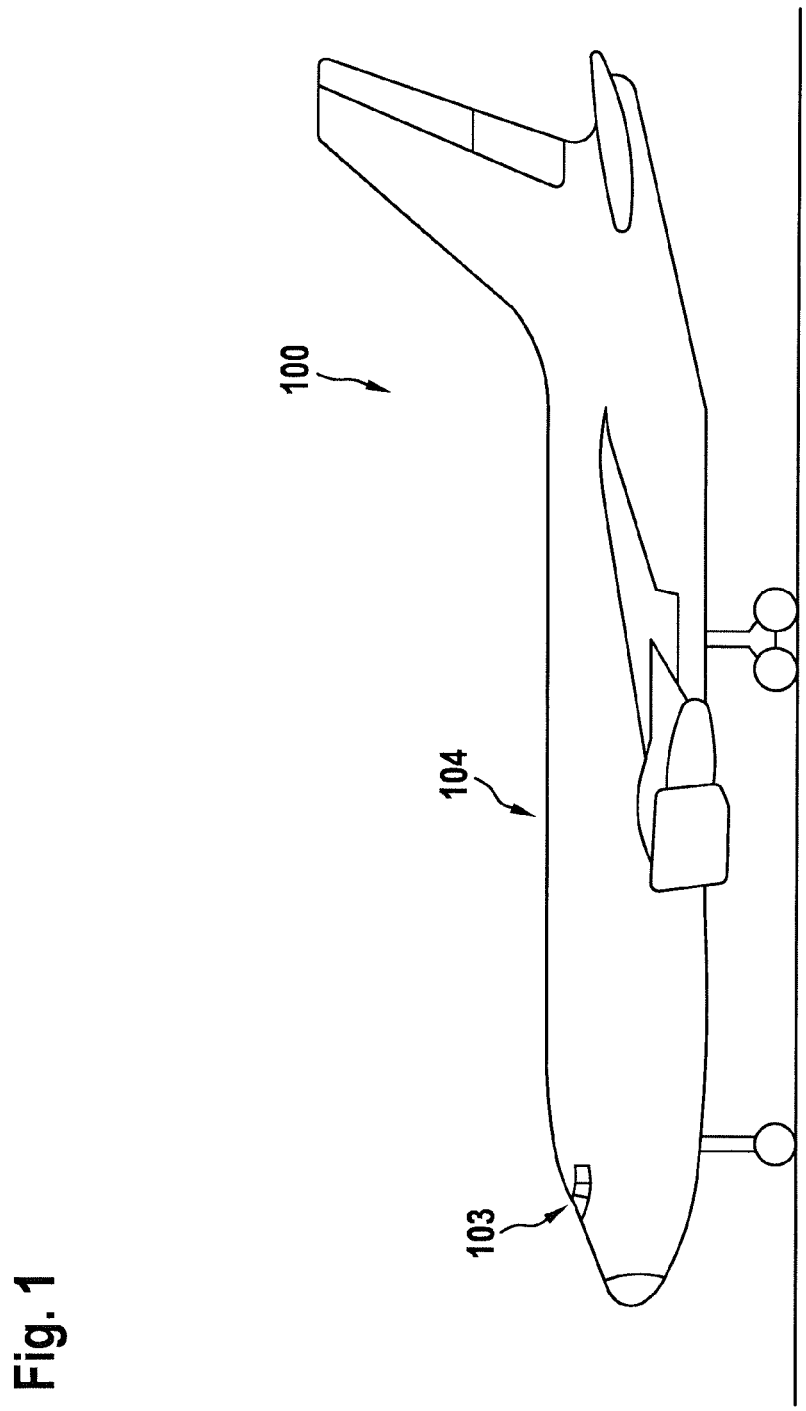
FIG. 1 depicts a schematic side view of an aircraft in accordance with an exemplary embodiment of the invention.

FIG. 1 depicts a schematic side view of an aircraft 100, in particular of an air plane, in accordance with an exemplary embodiment of the invention. In the exemplary embodiment shown in FIG. 1, the aircraft 100 is a large passenger air plane, comprising a cockpit 103 and a passenger cabin 104. The aircraft 100 may be a commercial passenger air plane, a private air plane, or a military aircraft. It is also possible that the aircraft is a rotorcraft, such as a helicopter.

Figure 2:
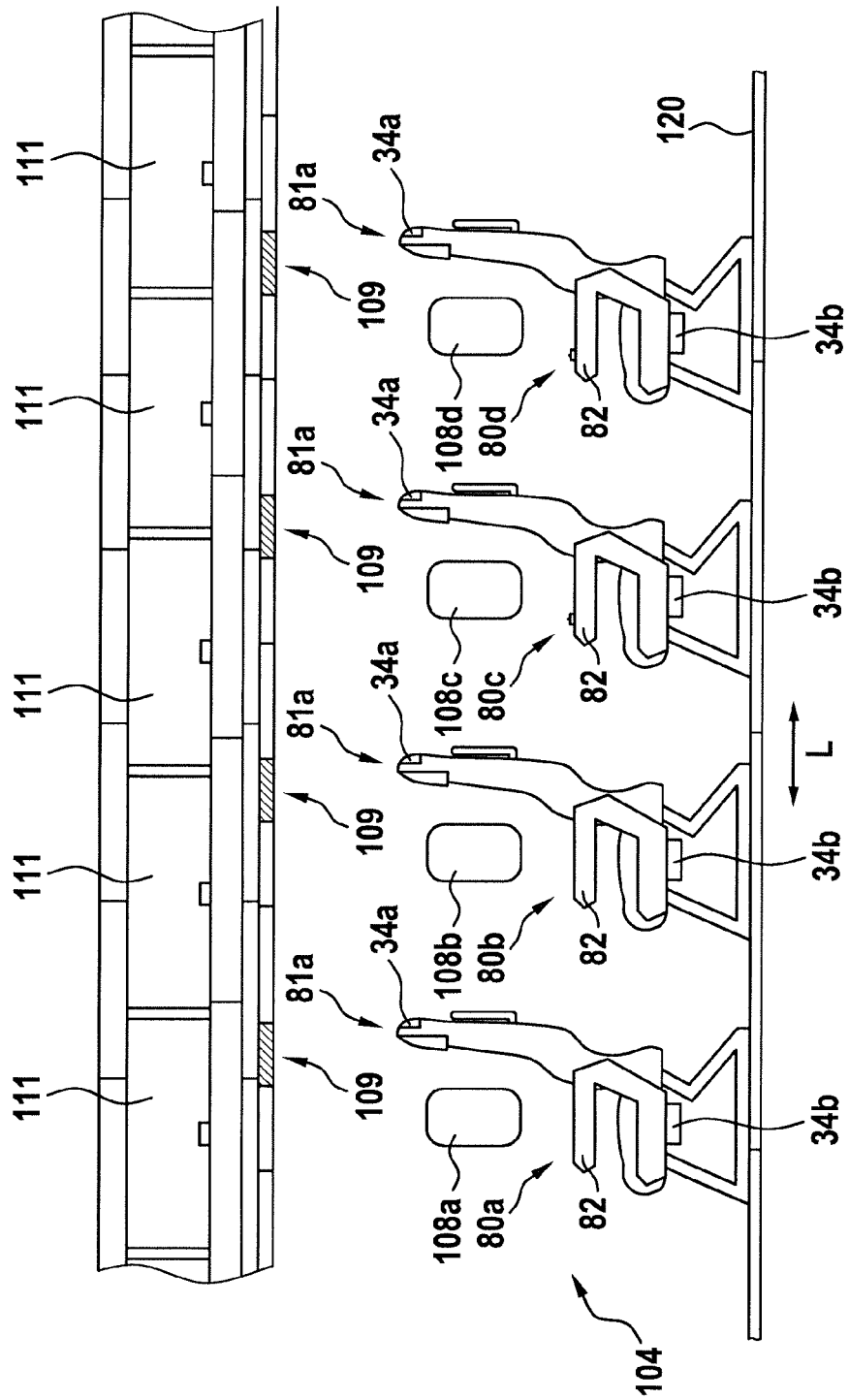
FIG. 2 shows a schematic longitudinal cross-sectional view of a section of a passenger cabin of the aircraft of FIG. 1.

FIG. 2 shows a schematic longitudinal cross-sectional view of a section of the passenger cabin 104 of the aircraft 100, which is shown in FIG. 1.

Figure 3:
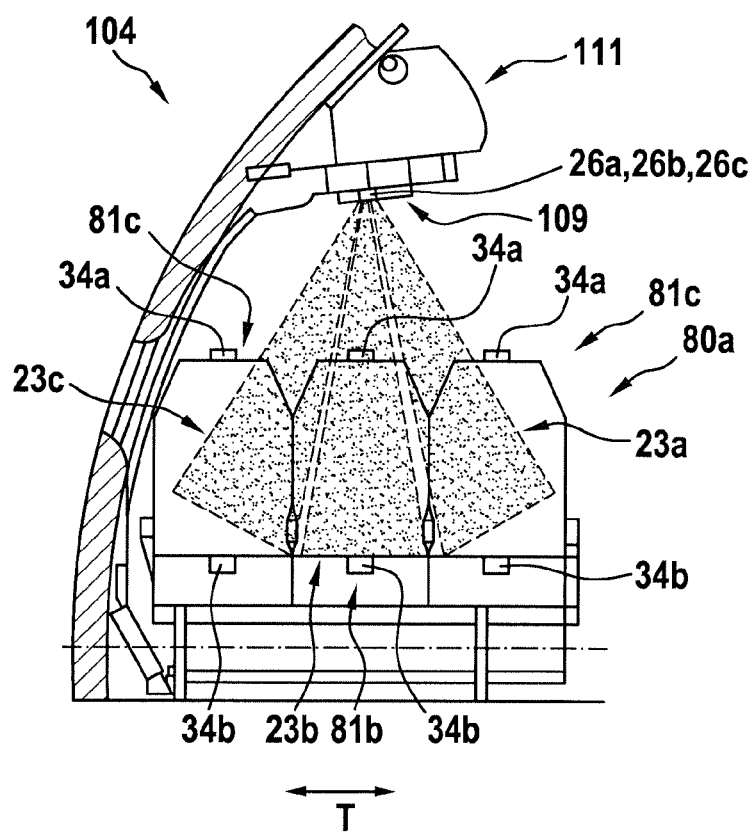
FIG. 3 shows a lateral cross-sectional view of a portion of the passenger cabin shown in FIG. 2.

FIG. 3 shows a partial cross-sectional view of the passenger cabin 104 in a plane which is oriented in a lateral direction, i.e. in a plane which is oriented orthogonal to the plane of the longitudinal cross-sectional view depicted in FIG. 2.

Four seats 81a, which are also referred to as passenger seats 81a, are visible in FIG. 2. The passenger seats 81a are mounted to a floor 120 of the passenger cabin 104. Each of the depicted passenger seats 81a belongs to a different seat row 80a-80d. The seat rows 80a-80d are spaced apart from each other along a longitudinal direction L of the passenger cabin 104.

For each of the seat rows 80a-80d, a window 108a-108d is provided, which allows the passengers to view the outside of the aircraft 100. Further, a plurality of overhead baggage compartments 111, which provide storage space for the passengers' baggage, are provided above the passenger seats 81a.

A respective aircraft overhead passenger service unit (PSU) 109 is provided above each of the seat rows 80a-80d.

Each seat row 80a-80d may include a plurality of passenger seats 81a-81c, for example three passenger seats 81a-81c, which are arranged next to each other along a lateral direction T, which is oriented orthogonal to the longitudinal direction L (cf. FIG. 3). The additional passenger seats, i.e. the middle seat 81b and the window seat 81c, of each seat row 80a-80d are not visible in FIG. 2, as they are arranged behind and therefore hidden by the aisle seats 81a, which are depicted in FIG. 2.

A single seat row 80a comprising three passenger seats 81a-81c, which are arranged next to each other along the lateral direction T, is shown in FIG. 3.

The aircraft overhead passenger service unit 109 comprises reading lights 26a-26c for providing reading light illumination 23a-23c to the three passenger seats 81a-81c, as it is schematically illustrated in FIG. 3.

Each of the passenger seats 81a-81c is provided with two tags 34a, 34b, respectively. A first tag 34a may be attached to the headrest of each passenger seat 81a-81c. A second tag 34b may be provided at the seat pan of each passenger seat 81a-81c. The positions of the tags 34a, 34b, as depicted in FIGS. 2 and 3, are only examples, and the tags 34a, 34b may be positioned at other portions of the passenger seats 81a-81c as well. Each passenger seat 81a-81c may also be equipped with only a single tag or with more than the depicted two tags 34a, 34b.

The tags 34a, 34b may be optical tags 34a, 34b. They may also be radio tags 34a, 34b, which are configured for emitting radio signals.

Figure 4:
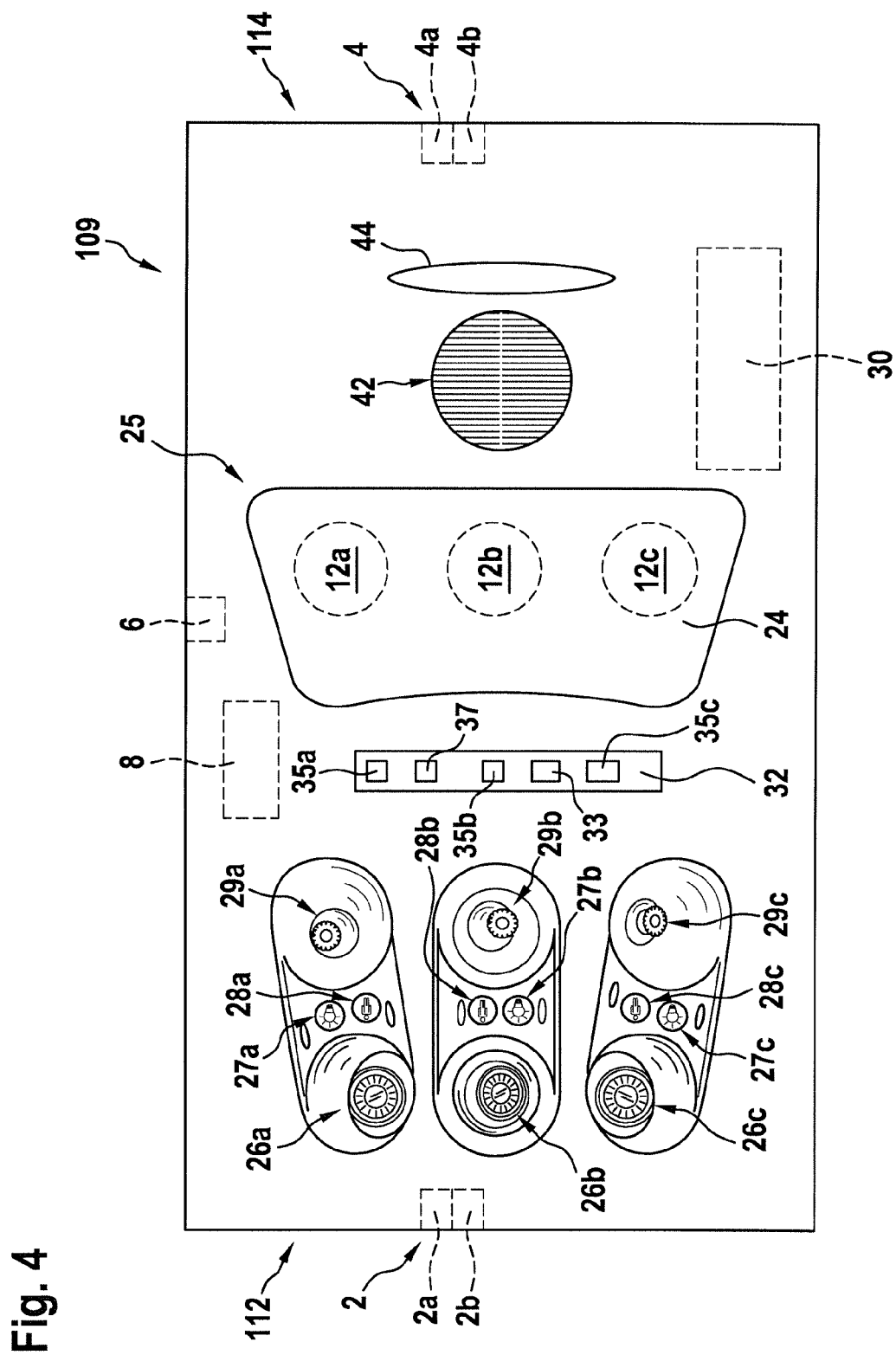
FIG. 4 depicts a schematic plan view of an aircraft overhead passenger service unit in accordance with an exemplary embodiment of the invention.

FIG. 4 depicts a schematic plan view of an aircraft overhead passenger service unit 109 in accordance with an exemplary embodiment of the invention, as it is seen from the position of a passenger sitting on a passenger seat 81a-81c below the aircraft overhead passenger service unit 109.

In a portion, which is shown to the left hand side in FIG. 4, the aircraft overhead passenger service unit 109 comprises three reading lights 26a-26c. Each of the reading lights 26a-26c is assigned to one of the three passenger seats 81a-81c, which are located below the aircraft overhead passenger service unit 109, for providing reading light illumination 23a-23c to the respectively assigned passenger seat 81a-81c, as it is illustrated in FIG. 3.

Six electrical switches 27a-27c, 28a-28c are provided next to the reading lights 26a-26c.

The electrical switches 27a-27c, 28a-28c are grouped in pairs, with each pair comprising two electrical switches 27a-27c, 28a-28c, respectively. Each pair of electrical switches 27a-27c, 28a-28c is assigned to one of the three passenger seats 81a-81c, which are arranged below the passenger service unit 109.

A first switch 27a-27c of each pair of switches 27a-27c, 28a-28c is configured as a reading light switch 27a-27c for switching a reading light 26a-26c, which is assigned to the same passenger seat 81a-81c as the respective first switch 27a-27c.

The second switch 28a-28c of each pair of switches 27a-27c, 28a-28c is configured for triggering a signal for calling cabin service personnel.

A row of three adjacent gaspers 29a-29c is provided next to the pairs of switches 27a-27c, 28a-28c. Each of the gaspers 29a-29c is assigned to one of the three passenger seats 81a-81c, which are arranged below the passenger service unit 109.

Next to the gaspers 29a-29c, there is a seat detection sensor 32, which is configured for determining the positions and/or the orientations of the passenger seats 81a-81c, which are located below the passenger service unit 109. The seat detection sensor 32 will be discussed in more detail further below.

Next to the seat detection sensor 32, there is an oxygen mask storage portion 25. The oxygen mask storage portion 25 comprises a movable door 24, which covers an oxygen mask storage compartment. The oxygen mask storage compartment houses at least three oxygen masks 12a-12c, which are coupled to an oxygen supply 30, for example to an oxygen source such as a pressurized oxygen container or a chemical oxygen generator.

In an emergency situation, which results in a loss of air pressure within the passenger cabin 104, the movable door 24 will open and allow the oxygen masks 12a-12c to drop out of the oxygen mask storage compartment. Each of the passengers sitting below the aircraft overhead passenger service unit 109 may grasp one of the oxygen masks 12a-12c. After being activated, the oxygen supply 30 may supply an oxygen rich gas to the oxygen masks 12a-12c, in order to allow the passengers to breathe almost normally, even in case of a loss of air pressure within the passenger cabin 104.

The oxygen supply 30 may be activated by an emergency signal in response to a loss of air pressure within the passenger cabin 104. Alternatively, the oxygen supply 30 may be activated in response to a first breath taken by a passenger through the oxygen mask 12a-12c.

Next to the oxygen mask storage portion 25, a grid 42 is formed within the aircraft overhead passenger service unit 109. A loudspeaker (not shown), which may be used for delivering acoustic announcements to the passengers, may be arranged behind said grid 42.

Next to the grid 42, there is a display panel 44 comprising at least one selectively illuminatable visual sign, which may be selectively illuminated from behind for showing a plurality of different visual signs/messages (not shown) to the passengers. The visual signs may include at least one of a "non smoking" sign, a "fold up your table" sign, a "switch off your electronic devices" sign, and/or a "fasten you seat belt" sign.

The aircraft overhead passenger service unit 109 is further equipped with two near field communication interfaces 2, 4, which are provided in opposing end portions 112, 114 of the passenger service unit 109.

A first near field communication interface 2 may be provided in a first end portion 112 of the passenger service unit 109, which is shown on the left hand side of FIG. 4, and a second near field communication interface 4 may be provided in a second end portion 114 of the passenger service unit 109, which is shown on the right hand side of FIG. 4. The first end portion 112 may be a front end portion of the passenger service unit 109, and the second end portion may be a rear end portion of the passenger service unit 109, or vice versa.

The passenger service unit 109 further comprises a communication controller 8, which is configured for controlling the operation of the near field communication interfaces 2, 4.

The near field communication interfaces 2, 4 and the communication controller 8 may be provided on an upper side of the passenger service unit 109, which faces away from the passenger seats 81a-81c, when the passenger service unit 109 is installed within the passenger cabin 104, as it is shown in FIGS. 2 and 3. In consequence, the near field communication interfaces 2, 4 and the communication controller 8 may be not visible to passengers sitting on the passenger seats 81a-81c. The near field communication interfaces 2, 4 and the communication controller 8 are therefore depicted using dashed lines in FIG. 4.

Each of the near field communication interfaces 2, 4 comprises a respective transmitter 2a, 4a and a respective receiver 2b, 4b. The transmitters 2a, 4a and the receivers 2b, 4b allow for a wireless exchange of messages with a corresponding near field communication interface of a neighboring aircraft passenger service unit. The transmitters 2a, 4a and the receivers 2b, 4b are depicted as two separated components in FIG. 4. The transmitters 2a, 4a and the receivers 2b, 4b also may be integrated as respective transceiver components.

The transmitters 2a, 4a of the near field communication interfaces 2, 4 are configured for transmitting messages comprising information that identifies the aircraft passenger service unit 109, which is sending the respective message. The messages, which are sent by the transmitters 2a, 4a, may further comprise information that identifies the particular one of the at least two near field communication interfaces 2, 4 of the aircraft passenger service unit 109, which is employed for sending the respective message.

The receivers 2b, 4b of the near field communication interfaces 2, 4 are configured for receiving messages that are sent by near field communication interfaces of neighboring aircraft passenger service units. The received messages may comprise information that identifies the neighboring aircraft passenger service unit and the particular one of the at least two near field communication interfaces of the neighboring aircraft passenger service unit, which is employed for sending the respective message.

In the context of the present application, "near field communication" may mean that the range of the data transmission via the near field communication interfaces 2, 4 is limited to distances that may be commonly encountered between neighboring aircraft passenger service units in an aircraft cabin. In most use cases, the neighboring aircraft passenger service units are in close proximity to each other, so that the communication range of the near field communication interfaces 2, 4 may be chosen to not substantially exceed the dimensions of the aircraft passenger service unit 109. In order to provide for a safety margin in the communication capabilities of the near field communication interfaces 2, 4, the communication range may be higher, such as between 5 and 20 times the dimensions of the aircraft passenger service unit 109. It is understood that the given values are exemplary only.

The near field communication interfaces 2, 4 may in particular be configured so that they allow for a wireless exchange of message with a corresponding near field communication interface of an adjacent aircraft passenger service unit, which faces the respective near field communication interface 2, 4, but that the spatial range of the wireless data transmission via the near field communication interfaces 2, 4 is not large enough for exchanging messages with aircraft passenger service units, which are arranged in larger distances. The spatial range of the wireless data transmission may also not be sufficiently large for communicating with a communication interface of a neighboring aircraft passenger service unit, which is located at an opposing end portion of the neighboring aircraft passenger service unit, i.e. at an end portion that faces away from the respective near field communication interface 2, 4.

The near field communication interfaces 2, 4 may be configured for optical data transmission, in particular for a data transmission, which uses visible light and/or infrared light for transmitting the data. The near field communication interfaces 2, 4 of two aircraft passenger service units 109, which are arranged adjacent to each other, may in particular form an optocoupler, which allows for exchanging messages between the two aircraft passenger service units 109 by optical data transmission. When using optical data transmission, suitable light shutters may be employed for ensuring that only facing near field communication interfaces of neighboring aircraft passenger service units communicate with each other.

The near field communication interfaces 2, 4 may also be configured for using electromagnetic waves in the range of radio frequencies, in particular in a range of between 1 MHz and 100 MHz, more particularly in a range of between 10 MHz and 20 MHz, for transmitting the data.

The messages, which are exchanged between the near field communication interfaces 2, 4, may, for example, include a unique hardware identifier, similar to a MAC address, which uniquely identifies the communication controller 8 of the respective aircraft passenger service unit 109.

The messages may further include additional signals, for example burst signals, which are generated in accordance with a predefined code, for transmitting information about the spatial orientation of the aircraft passenger service unit 109 with respect to its neighboring aircraft passenger service units 109.

The messages, which are sent by the transmitters 2a, 4a of the first and second near field communication interfaces 2, 4, may, for example, comprise different numbers of pulses, respectively.

For example, messages, which are sent by the transmitter 2a of the first near field communication interface 2, which is provided at the first end portion 112 of the aircraft passenger service unit 109, may include four pulses. Messages, which are sent by the transmitter 4a of the second near field communication interface 4, which is provided at the second end portion 114 of the aircraft passenger service unit 109, may include three pulses. This allows the communication controller of the aircraft passenger service unit, which receives the messages, to determine whether the received message has been sent by the transmitter 2a, which is provided at the first end portion 112, or by the transmitter 4a, which is provided at the second end portion 114 of the aircraft passenger service unit 109.

The aircraft passenger service unit 109 may acknowledge the receipt of a burst signal by sending a confirmation signal. Said confirmation signal may in particular include a "confirmation burst", which may in particular have a different number of pulses than the previously sent message. The confirmation signal may, for example, include only two pulses. Alternatively, the confirmation signal may comprise five or more pulses. The confirmation signal is received by the receiver 2b, 4b of the near field communication interface 2, 4, which sent the original message.

If no confirmation signal is received by the receiver 2b, 4b, the communication controller 8 of the aircraft passenger service unit 109 concludes that no further aircraft passenger service unit 109 is present within the maximum transmission range of the respective near field communication interface 2, 4 on the respective side of the aircraft passenger service unit 109.

Figure 5A:
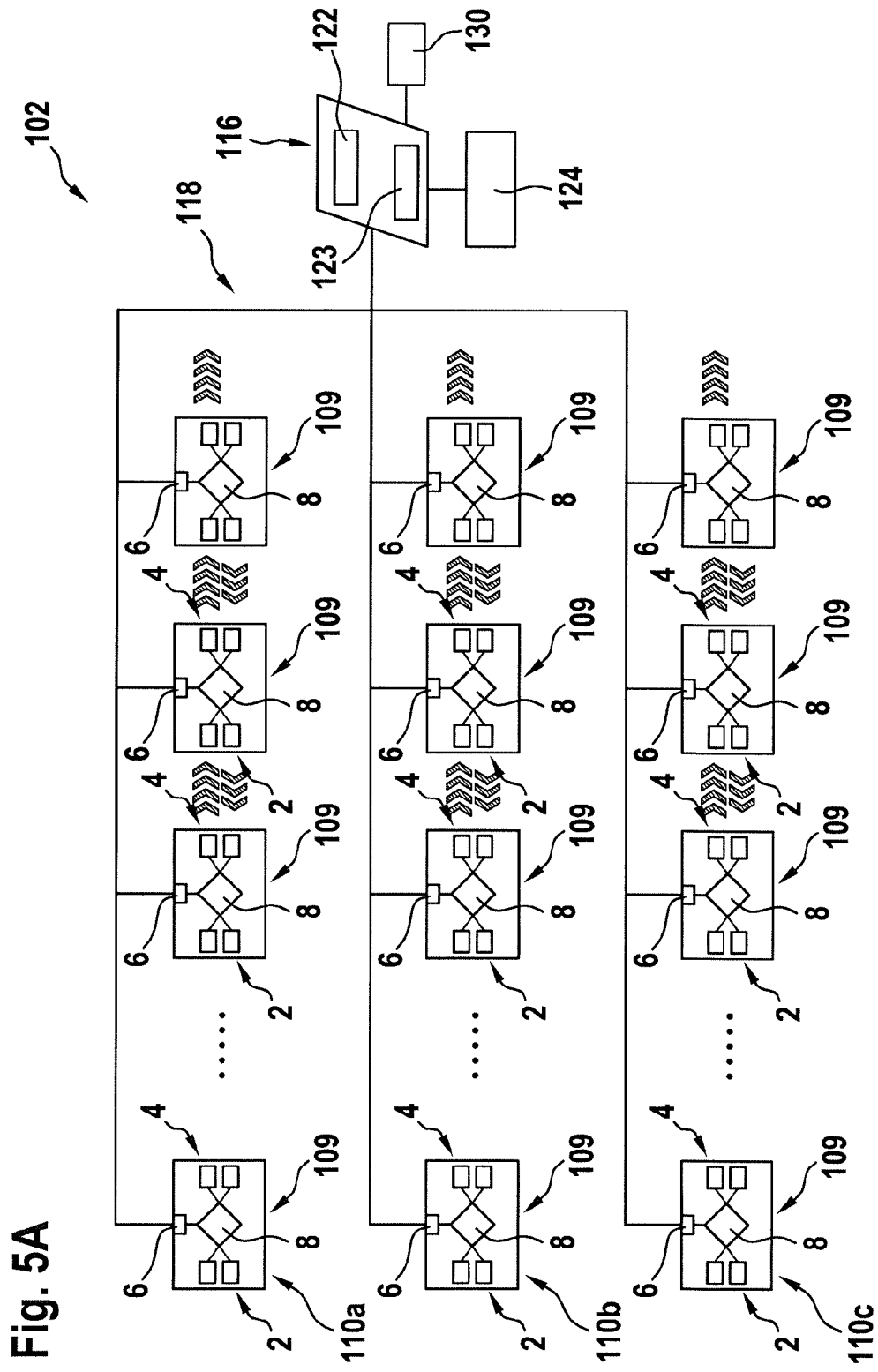
FIG. 5A schematically shows an exemplary assembly of aircraft passenger service units according to an exemplary embodiment of the invention.

The passenger service unit 109 further comprises a master communication interface 6, which allows the aircraft passenger service unit to communicate with a master controller 116, which is not shown in FIG. 4, but in FIG. 5A.

The master communication interface 6 may be configured for communicating with the master controller 116 via a wired data connection. The master communication interface 6 may in particular be configured for being coupled to and for communicating via a communication bus 118, as shown in FIG. 5A, which allows for simultaneously coupling a plurality of aircraft passenger service units 109 with the master controller 116.

The master communication interface 6 may also be configured for wireless communication with the master controller 116. The master communication interface 6 may in particular be configured for communicating with the master controller 116 by data transmission using electromagnetic waves having radio frequencies, such as frequencies in the range of between 1 GHz and 20 GHz, in particular frequencies in the range of between 2 GHz and 11 GHz. The master controller 116 may in particular use WLAN, Bluetooth®, or a similar protocol for the wireless communication.

FIG. 5A schematically illustrates an exemplary assembly 102 of aircraft passenger service units 109, as it may be installed within the passenger cabin 104 of an aircraft 100.

In the exemplary configuration depicted in FIG. 5A, the assembly 102 of aircraft passenger service units 109 comprises three continuous, i.e. uninterrupted, chains 110a-110c of aircraft passenger service units 109.

A continuous chain 110a-110c of aircraft passenger service units 109 comprises a plurality of aircraft passenger service units 109, which are arranged next to each other forming a row of aircraft passenger service units 109. Every aircraft passenger service unit 109 except for a first aircraft passenger service unit 109 and a last aircraft passenger service unit 109, which are arranged at opposing ends of the row, have two neighboring aircraft passenger service units 109, namely a first neighboring aircraft passenger service unit 109, which is arranged adjacent to the first end portion 112, and a second neighboring aircraft passenger service unit 109, which is arranged adjacent to the second end portion 114 of the respective aircraft passenger service unit 109. Every aircraft passenger service unit 109 of a chain 110a-110c of aircraft passenger service units 109 is able to exchange messages with its respective neighboring aircraft passenger service units 109 via the near field communication interfaces 2, 4.

Each chain 110a-110c of aircraft passenger service units 109 may correspond to a group of passenger seats within the passenger cabin 104.

Figure 5B:
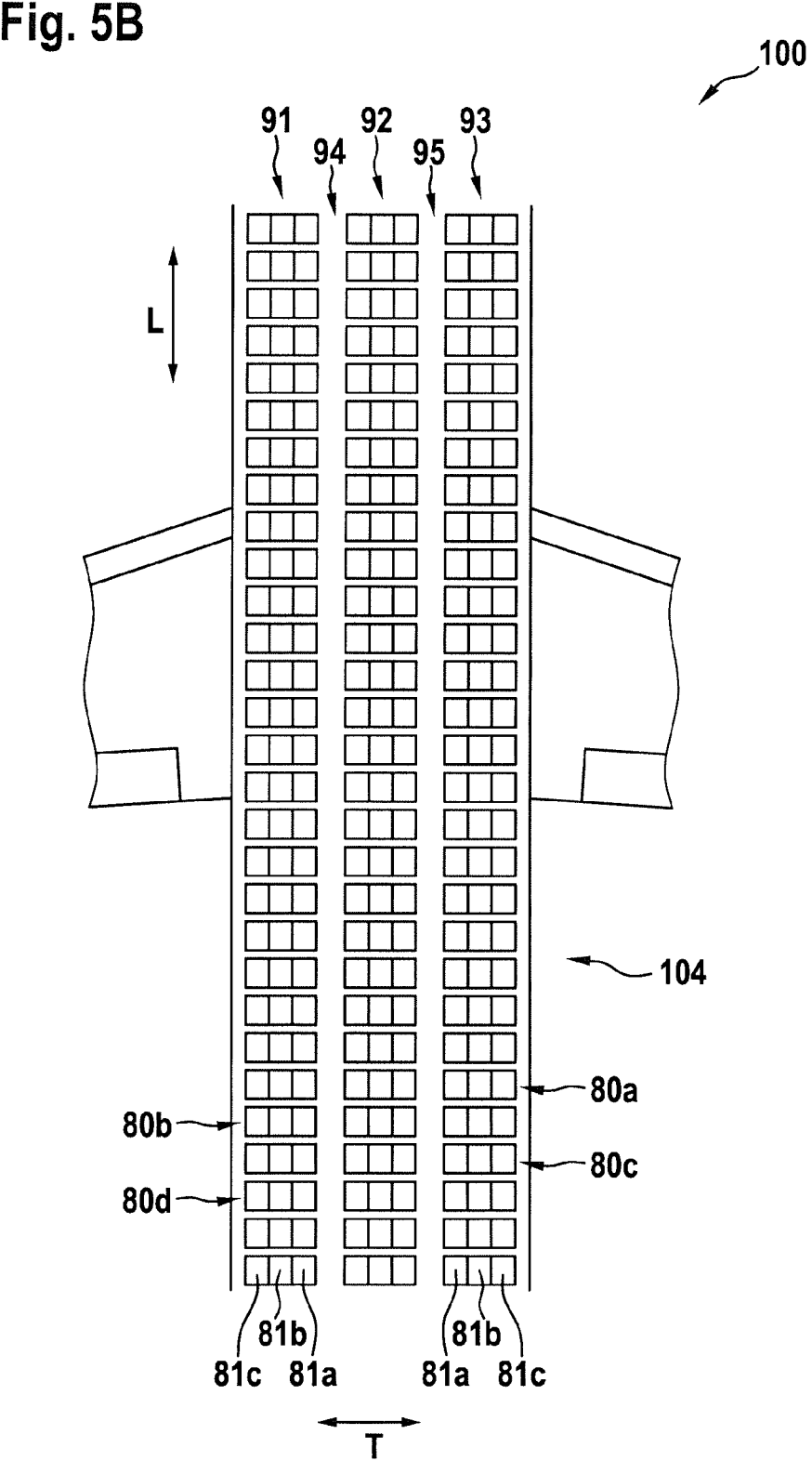
FIG. 5B depicts a schematic cut-open view of an aircraft of an exemplary embodiment of the invention, depicting an overhead view of a portion of the passenger cabin, wherein the aircraft may be equipped with the assembly of aircraft passenger service units of FIG. 5A.

FIG. 5B depicts a schematic cut-open view of an aircraft 100 in accordance with an exemplary embodiment of the invention, depicting an overhead view of a portion of the passenger cabin 104, wherein the aircraft 100 is equipped with the assembly 102 of aircraft passenger service units 109 of FIG. 5A.

The aircraft 100 comprises a first group 91 of passenger seats 81a-81c, which are arranged on a left side of the passenger cabin 104, a second group 92 of passenger seats 81a-81c, which are arranged in a middle portion of the passenger cabin 104, and a third group 93 of passenger seats 81a-81c, which are arranged on a right side of the passenger cabin 104.

Each group 91-93 of passenger seats 81a-81c comprises a plurality of rows of passenger seats 81a-81c, with four exemplary rows being indicated with reference numerals 80a-80d. A first aisle 94, which extends in the longitudinal direction L of the passenger cabin 104, is formed between the first group 91 and the second group 92 of passenger seats 81a-81c, and a second aisle 95, which also extends in the longitudinal direction L of the passenger cabin 104, is formed between the second group 92 and the third group 93 of passenger seats 81a-81c.

A first chain 110a of aircraft passenger service units 109, as shown in FIG. 5A, may be installed over the first group 91 of passenger seats 81a-81c. A second chain 110b of aircraft passenger service units 109 may be installed over the second group of passenger seats 81a-81c. A third chain 110c of aircraft passenger service units 109 may be installed over the third group of passenger seats 81a-81c.

Smaller aircraft 100 may comprise only one or two groups of passenger seats 81a-81c, and in consequence only one or two chains 110a-110c of aircraft passenger service units 109. On the other hand, large aircraft 100 may comprise more than three groups of passenger seats 81a-81c and/or more than three chains 110a-110c of aircraft passenger service units 109.

If a row of aircraft passenger service units 109 is interrupted, for example by a lavatory, a galley and/or an exit, which is arranged between two aircraft passenger service units 109 of said row, so that these two aircraft passenger service units 109 are not able to communicate with each other via their near field communication interfaces 2, 4, said row of aircraft passenger service units 109 is considered as two chains 110a-110c of aircraft passenger service units 109, so that all aircraft passenger service units 109 of every chain 110a-110c of aircraft passenger service units 109 are able to communicate with each other via their near field communication interfaces 2, 4.

The assembly 102 of aircraft passenger service units 109 further includes a master controller 116. The master controller 116 may be integrated with one of the aircraft passenger service units 109. Alternatively, the master controller 116 may be a separate master controller 116, which is provided in addition to the aircraft passenger service units 109, at it is shown in FIG. 5A.

In the embodiment depicted in FIG. 5A, the aircraft passenger service units 109 are coupled to the master controller 116 via a communication bus 118, which allows the aircraft passenger service units 109 and the master controller 116 to communicate with each other. As mentioned before, the communication between the aircraft passenger service units 109 and the master controller 116 may be implemented as a wireless communication as well.

The communication bus 118 and/or the wireless communication may further allow the aircraft passenger service units 109 to communicate with each other.

Each of the plurality of aircraft passenger service units 109 is configured for exchanging identification information by communicating with its one or two directly neighboring aircraft passenger service units 109 via its near field communication interfaces 2, 4.

Every aircraft passenger service unit 109 is further configured for sending, via its master communication interface 6, identification information about itself and the identification information about its respective neighboring aircraft passenger service units 109, which it obtained by communicating with its respective neighboring aircraft passenger service units 109 via its near field communication interfaces 2, 4, to the master controller 116.

The master controller 116 is configured for receiving the identification information, which is sent by the aircraft passenger service units 109.

The master controller 116 may further be configured to receive additional high level arrangement information. The additional high level arrangement information may allow the master controller 116 to determine a spatial position of at least one continuous chain 110a-110c of aircraft passenger service units 109 within a passenger cabin 104. Alternatively of additionally, the high level arrangement information may allow the master controller 116 to determine the spatial positions and/or orientations of at least two continuous chains 110a-110c of aircraft passenger service units 109 with respect to each other.

The master controller 116 may be configured to receive said additional high level arrangement information by receiving a manual input via a manual input device 130. The high level arrangement information may in particular be manually input by a technician, after the arrangement of the aircraft passenger service units 109 within the passenger cabin 104 has been set/changed.

Alternatively of additionally, the aircraft passenger service unit assembly 102 may comprise a position determining system 124, which is configured for determining the spatial position and/or the spatial orientation of at least one aircraft passenger service unit 109 in the passenger cabin 104 of the aircraft 100. In such an embodiment, the master controller 116 may be configured for receiving the additional high level arrangement information from the position determining system 124. Such a configuration may avoid the need for manually inputting the additional high level arrangement information into the master controller 116.

The master controller 112 may be configured to process the information, which it received from the plurality of aircraft passenger service units 109, from the position determining system 124 and/or from the manual input device 130, for generating a virtual map 122, which provides a "digital twin" of the spatial arrangement of the plurality of aircraft passenger service units 109. Said virtual map 122 may in particular indicate the spatial positions and/or the spatial orientations of the plurality of aircraft passenger service units 109 with respect to each other and/or with respect to certain landmarks within the passenger cabin 104.

The virtual map 122 may include a spreadsheet comprising entries, which indicate, for each of the aircraft passenger service units 109, the directly neighboring aircraft passenger service units 109 and the respective orientations of the aircraft passenger service units 109 with respect to each other.

The virtual map 122 may also include other data structures than spreadsheets, for example dynamically linked lists, for storing the information about the neighbors and their respective orientations of each of the aircraft passenger service units 109.

As mentioned with respect to FIG. 4, the aircraft passenger service unit 109 may further comprise a seat detection sensor 32 for determining the position and/or the orientation of a least one passenger seat 81a-81c with respect to the aircraft passenger service unit 109.

The seat detection sensor 32 may comprise at least one radio receiver as shown in FIG. 4, which is configured for detecting radio signals, which are emitted by at least one radio tag 34a, 34b.

Radio tags 34a, 34b may be attached to all passenger seats 81a-81c within the passenger cabin 104, as it is depicted in FIGS. 2 and 3.

When the passenger seats 81a-81c of a row 80a-80d of passenger seats 81a-81c are arranged at predefined distances and angles with respect to each other, knowing the position and the orientation of a single passenger seat 81a-81c of each row of passenger seats 81a-81c may allow for determining the spatial positions and orientations of all passenger seats 81a-81c of said row 80a-80d of passenger seats 81a-81c.

Thus, it might be sufficient that radio tags 34a, 34b are provided at only one of the passenger seats 81a-81c of each row 80a-80d of passenger seats, in order to allow for determining the position of said one passenger seat with respect to the seat detection sensor 32.

Each radio tag 34a, 34b is configured for emitting radio signals, in particular electromagnetic signals with frequencies in a frequency range of between 1 GHz and 20 GHz, further in particular electromagnetic signals with frequencies in a frequency range of between 2 GHz and 11 GHz.

The radio tags 34a, 34b may be configured for emitting the radio signal in response to receiving an electromagnetic trigger signal, which is emitted by a trigger signal transmitter 37, which is provided at the aircraft passenger service unit 109. The trigger signal transmitter 37 may be integrated with the seat detection sensor 32, or it may be provided separately from the seat detection sensor 32.

In order to allow for unambiguously determining the positions of the radio tags 34a, 34b within the passenger cab in 104, each aircraft passenger service unit 109 may comprise a plurality of, in particular two or three, radio receivers 35a-35c.

It is also possible to combine information, which is provided by a plurality of seat detection sensors 32, which are provided at different aircraft passenger service units 109, for determining the positions of the radio tags 34a, 34b within the passenger cabin 104.

Exemplary embodiments of seat detection sensor configurations, which may be employed for determining the position of a radio tag, are schematically illustrated in FIGS. 6 to 9.

Figure 6:
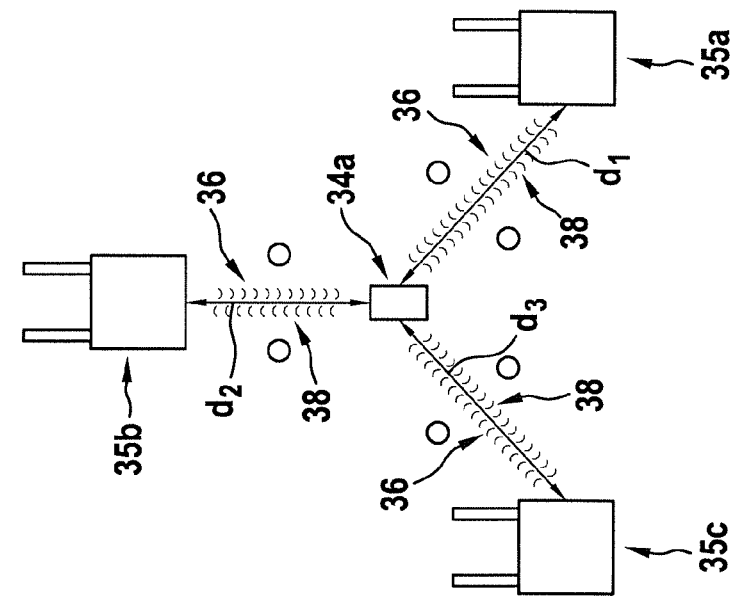
FIG. 6 schematically illustrates determining the position of a radio tag, as may be implemented in an aircraft passenger service unit and/or an aircraft passenger service unit assembly in accordance with exemplary embodiments of the invention, using a "two-way-ranging" method.

In the exemplary embodiment depicted in FIG. 6, the position of a radio tag 34a with respect to three radio receivers 35a-35c is determined by applying a "three-way-ranging-method" (TWR). When this method is employed, each of three radio receivers 35a-35c emits a trigger signal 36, which triggers the radio tag 34a to emit a radio signal 38 in response to receiving the trigger signal 36. The distances d1, d2, d3 between the radio tag 34a and each of the three radio receivers 35a-35c may be determined from the runtimes of the trigger signals 36 and the corresponding radio signal 38, i.e. from the time periods between sending the trigger signal 36 and receiving the corresponding radio signal 38, which is sent in response to receiving the trigger signal 36. The position of the radio tag 34a with respect to the three radio receivers 35a-35c may be unambiguously determined from the distances d1, d2, d3 between the radio tag 34a and each of the three radio receivers 35a-35c. It is also possible that the distances d1, d2, d3 are determined from the amplitudes of the receptions of the radio signal 38, which is sent in response to receiving the trigger signal 36 and which is received at the three radio receivers 35a-35c.

Figure 7:
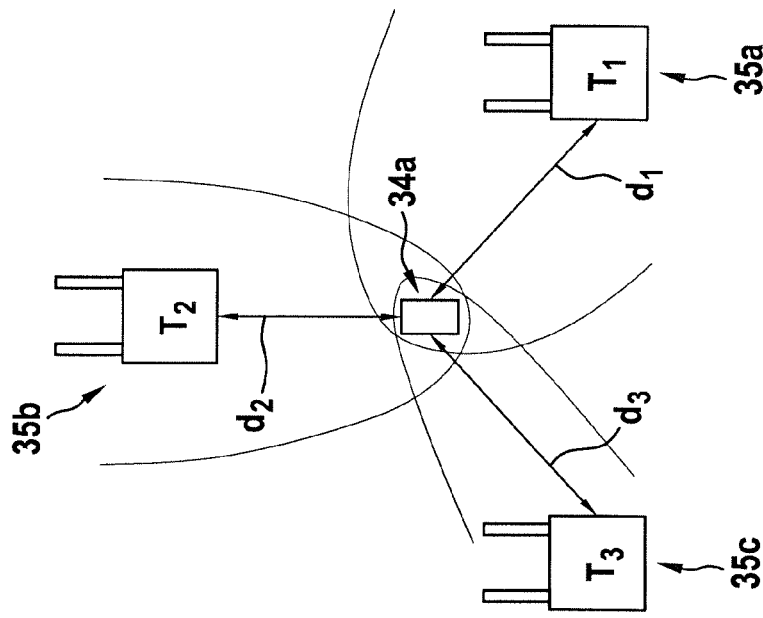
FIG. 7 schematically illustrates determining the position of a radio tag, as may be implemented in an aircraft passenger service unit and/or an aircraft passenger service unit assembly in accordance with exemplary embodiments of the invention, using a "time-difference-of-arrival" method.

In the exemplary embodiment depicted in FIG. 7, the position of the radio tag 34a is determined by applying a "time-difference-of-arrival-method" (TdoA). In said method, the arrival (receipt) of the same radio signal, which is emitted by the radio tag 34a, is detected by the three radio receivers 35a-35c. The distances d1, d2, d3 between the radio tag 34a and each of the three radio receivers 35a-35c may then be determined from the differences between the times of arrival T1, T2, T3, at the three different radio receivers 35a-35c. Again, the position of the radio tag 34a with respect to the three radio receivers 35a-35c may be unambiguously determined from the distances d1, d2, d3 between the radio tag 34a and each of the three radio receivers 35a-35c.

Figure 8:
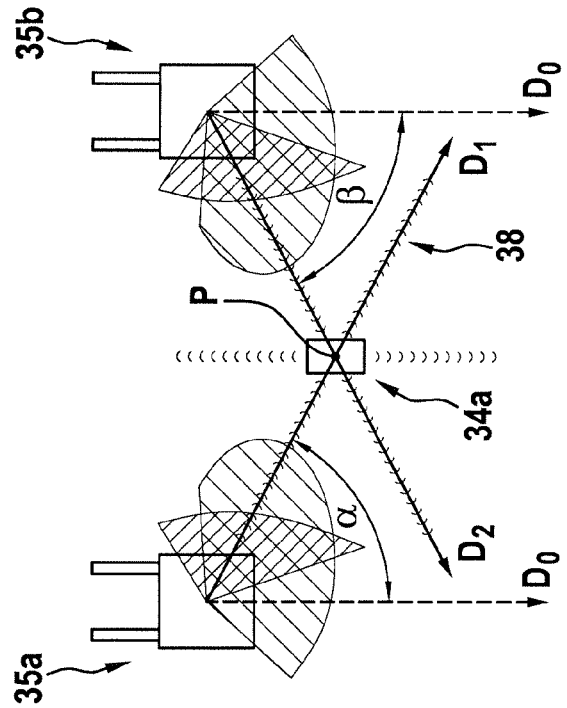
FIG. 8 schematically illustrates determining the position of a radio tag, as may be implemented in an aircraft passenger service unit and/or an aircraft passenger service unit assembly in accordance with exemplary embodiments of the invention, using an "angle-of-arrival" method.

In the exemplary embodiment is depicted in FIG. 8, the position of the radio tag 34a with respect to at least two radio receivers 35a, 35b is determined by applying an "angle-of-arrival-method" (AoA). When this method is applied, the spatial directions D1, D2, in particular the angles α, β between a predefined direction D0, and the directions D1, D2, from which radio signals 38, which are emitted by the radio tag 34a, are received by the at least two radio receivers 35a, 35b, are determined. The position of the radio tag 34a with respect to the at least two radio receivers 35a, 35b may the be determined as the point of intersection P between two virtual lines, which extend from the radio receivers 35a, 35b in the respectively determined directions D1, D2.

Figure 9:
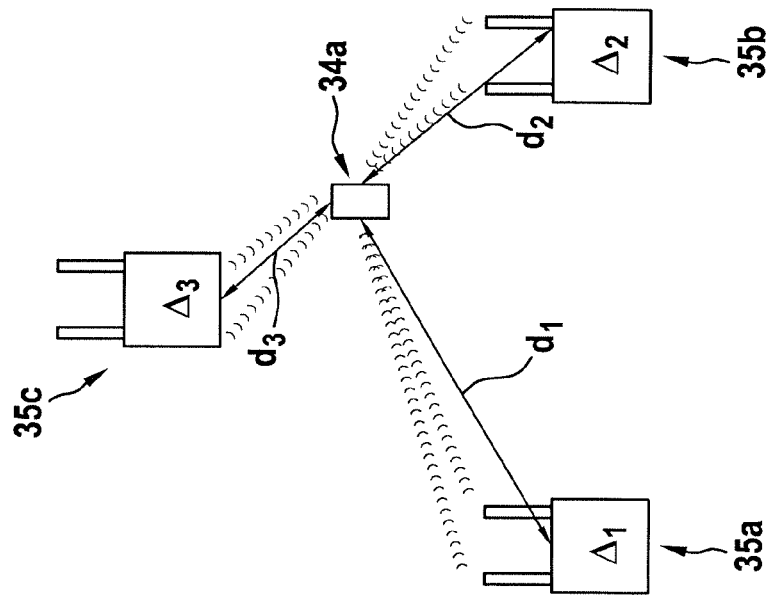
FIG. 9 schematically illustrates determining the position of a radio tag, as may be implemented in an aircraft passenger service unit and/or an aircraft passenger service unit assembly in accordance with exemplary embodiments of the invention, using a "phase-difference-of-arrival" method.

In the exemplary embodiment depicted in FIG. 9, the position of the radio tag 34a is determined by applying a "phase-difference-of-arrival-method" (PDoA). In this method, the same radio signal 38, which is emitted by the radio tag 34a, is received by at least three different radio receivers 35a-35c. The phase differences Δ1, Δ2, Δ3 between the signals, which are received at the three different radio receivers are functions of the distances d1, d2, d3 between the radio tag 34a and the respective radio receivers 35a-35c. Thus, the distances d1, d2, d3 between the radio tag 34a and the radio receivers 35a-35c can be determined from the phase differences Δ1, Δ2, Δ3. In consequence, the position of the radio tag 34a with respect to the three radio receivers 35a-35c can be unambiguously calculated from the detected phase differences Δ1, Δ2, Δ3.

The two or three radio receivers 35a-35c, which are depicted in each of FIGS. 6 to 9, may be installed in the same aircraft passenger service unit 109, the radio receivers may in particular be part of a single seat detection sensor 32.

In another embodiment, the two or three radio receivers 35a-35c may be installed in different aircraft passenger service units 109, which are configured to communicate with each other for exchanging information, which is provided by the radio receivers 35a-35c.

In all four methods, which are illustrated in FIGS. 6 to 9, the accuracy and the reliability of the determined position of the radio tag 34a may be improved by detecting the signals, which are emitted by the radio tag 34a, with additional radio receivers 35a-35c and employing known mathematical models for solving overdetermined equation systems.

The four different methods for determining the position of a radio tag within the passenger cabin 104 of an aircraft 10, which are schematically illustrated in FIGS. 6 to 9, are only shown and described as explanatory, but not restrictive examples. Other methods for determining the position of a radio tag within the passenger cabin 104 of an aircraft 10 may be employed as well.

Alternatively or complementary to the use of the radio tags 34a, 34b and the radio receivers 35a-35c, as it has been described with reference to FIGS. 6 to 9, the seat detection sensor 32 may comprise at least one optical sensor 33 for determining the positions and orientations of the passenger seats 81a-81c, which are arranged below the aircraft passenger service unit 109.

In an embodiment, which comprises at least one optical sensor 33, the spatial positions and orientations of the passenger seats 81a-81c may be determined by an automatic evaluation of the image data, which is provided by the at least one optical sensor 33. The automatic evaluation may, for example, include comparing the data, which is provided by the at least one optical sensor 33, with stored sets of data, which correspond to different configurations of passenger seats 81a-81c within the passenger cabin 104. In each of said different configurations, the passenger seats 81a-81c are arranged at different positions and in different orientations below the aircraft passenger service unit 109, respectively. The set of data among the stored sets of data, which is closest to the data provided by the seat detection sensor 32, may be identified, and the position and/or the orientation comprised in the identified set of data, may be considered as representing the actual positions and/or orientation of the passenger seats 81a-81c with respect to the passenger service unit 109.

The automatic evaluation may also include employing methods of artificial intelligence for evaluating and interpreting the data, which is provided by the at least one optical sensor 33.

In an embodiment, optical tags (or markers) may be provided at the passenger seats for facilitating the automatic evaluation of the data, which is provided by the at least one optical sensor 33. Said optical tags may have colors, in particular bright colors, which are well-suited for being detected by the at least one optical sensor 33. Alternatively or additionally, the optical tags may have distinctive graphical patterns, which facilitate and improve the determination of the positions and orientations of the passenger seats 81a-81c by automatic evaluation of the data provided by the at least one optical sensor 33. The optical tags may be provided at suitable locations of the passenger seats 81a-81c, such as at the head rest portions of the passenger seats 81a-81c.

The master controller 116 may be configured to process the passenger seat information, which it received from the plurality of aircraft passenger service unit, for generating a virtual seat map 123, the virtual seat map 123 comprising information about the positions and orientations of all passenger seats 81a-81c within the passenger cabin 104. The virtual seat map 123 may in particular comprise information about the positions and orientations of all passenger seats 81a-81c with respect to the aircraft passenger service units 109.

The master controller 116 may further be configured to control one or more operating parameters of the plurality of aircraft passenger service units 109, in particular lighting parameters of the plurality of aircraft passenger service units 109, based on information comprised in the virtual map 122 of the arrangement of the plurality of aircraft passenger service units 109 and/or in the virtual seat map 123.

In an example, the aircraft passenger service units 109 have reading lights that are capable of emitting reading light outputs in different directions. For example, it is possible that a reading light has an array of LEDs, wherein the LEDs, possibly in combination with associated individual optical systems, have different directivities/light output orientations. Depending on the relative position between the aircraft passenger service unit and the particular passenger seat, which is to be provided with a reading light output, one or more particular LEDs may be used for providing the desired reading light output. For a given combination of the virtual map 122 of the arrangement of the plurality of aircraft passenger service units and the virtual seat map 123, the master controller 116 may adapt the operation of the reading lights to the relative positions between aircraft passenger service units and passenger seats. In this way, the reading light output may be well-adapted to the particular position of every passenger seat.

In another example, there may be more aircraft passenger service units 109 than passenger seat rows. In such a scenario, it is possible that the master controller 116, on the basis of the virtual map 122 of the arrangement of the plurality of aircraft passenger service units and the virtual seat map 123, selects particular aircraft passenger service units and operates their functional components, while keeping the functional components of other aircraft passenger service units unused. In yet another example, some or all of the aircraft passenger service units may have more functional components per seat row distance than passenger seats per seat row. In such a scenario, the master controller 116 may operate particular functional components within a given aircraft passenger service unit, while keeping other functional components unused.

In the foregoing examples, the master controller 116 may adapt the aircraft passenger service units to the particular arrangements of the aircraft passenger service units and passenger seats. After a re-configuration of the passenger seats, i.e. after a change of the seat configuration/seat map within the aircraft cabin, the functions of the aircraft passenger service units may be conveniently adapted, without moving the aircraft passenger service units and/or without human interaction for re-configuring the aircraft passenger service units.

While the generation of the virtual map of the arrangement of the plurality of aircraft passenger service units and the virtual seat map lead to automated configuration options for the aircraft passenger service units, as described above, they also have other uses, which are independent of said automated configuration options. For example, generating the virtual map of the arrangement of the plurality of aircraft passenger service units may be used to check the actual installation positions of the aircraft passenger service units with respect to the planned installation positions. An automated check of the correctness of assembly of the aircraft passenger service units may be carried out. In another example, generating the virtual seat map may be used to check the actual installation positions of the passenger seats, e.g. after initial assembly or after a change of the seat configuration, with respect to the planned positions of the passenger seats. An automated check of the correctness of assembly of the passenger seats may be carried out. The aircraft passenger service unit, as described herein, may greatly contribute to any of these uses.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft passenger service unit assembly, comprising:
   a plurality of aircraft passenger service units, wherein each aircraft passenger service unit comprises: at least two near field communication interfaces;
   wherein each of the at least two near field communication interfaces is configured for a wireless exchange of messages with a corresponding near field communication interface of a neighboring aircraft passenger service unit; and
   wherein the messages include information that identifies the aircraft passenger service unit and the near field communication interface sending the respective message; and
   a master controller;
   wherein each of the plurality of aircraft passenger service units is coupled to the master controller via its master communication interface;

wherein each of the plurality of aircraft passenger service units is configured to send identification information about itself and identification information about its respective neighboring aircraft passenger service units, which has been obtained by exchanging messages with its respective neighboring aircraft passenger service units, to the master controller; and wherein the master controller is configured to process said identification information, received from the plurality of aircraft passenger service units, for generating a virtual map of the arrangement of the plurality of aircraft passenger service units, wherein the virtual map indicates spatial positions and/or orientations of the plurality of aircraft passenger service units with respect to each other.

2. The aircraft passenger service unit assembly according to claim 1, wherein two of the at least two near field communication interfaces of each aircraft passenger service unit are provided at opposing end portions of the aircraft passenger service unit, wherein a first near field communication interface is in particular provided at a first end portion of the aircraft passenger service unit and a second near field communication interface is in particular provided at an opposing second end portion of the aircraft passenger service unit.

3. The aircraft passenger service unit assembly according to claim 1, wherein the at least two near field communication interfaces of each aircraft passenger service unit are configured for optical data transmission using visible light and/or infrared light, or
wherein the at least two near field communication interfaces are configured for data transmission using radio frequencies.

4. The aircraft passenger service unit assembly according to claim 1, wherein each aircraft passenger service unit further comprises:
a master communication interface, which allows the aircraft passenger service unit to communicate with the master controller.

5. The aircraft passenger service unit assembly according to claim 4, wherein the master communication interface is configured for wireless communication or for wired communication, or it is configured for being coupled to and for communicating via a bus that allows for coupling a plurality of aircraft passenger service units with the master controller.

6. The aircraft passenger service unit assembly according to claim 1, wherein at least a subset of the plurality of aircraft passenger service units are arranged adjacent to each other in a continuous row or chain, and/or wherein respective subsets of the plurality of aircraft passenger service units are arranged adjacent to each other in a plurality of continuous rows or chains.

7. The aircraft passenger service unit assembly according to claim 6, wherein the master controller is configured to receive additional high level arrangement information, which allows the master controller to determine a spatial position of at least one continuous chain of aircraft passenger service units within a passenger cabin and/or which allows the master controller to determine spatial positions and/or orientations of at least two continuous chains of aircraft passenger service units with respect to each other.

8. The aircraft passenger service unit assembly according to claim 1, wherein each of the plurality of aircraft passenger service units is configured to determine a position and/or orientation of at least one passenger seat, which is located in the vicinity of, in particular below, the respective aircraft passenger service unit, and wherein each of the plurality of aircraft passenger service units is configured to send passenger seat information about said position and/or orientation of said at least one passenger seat to the master controller.

9. The aircraft passenger service unit assembly according to claim 8,
wherein the master controller is configured to process said passenger seat information, which it received from the plurality of aircraft passenger service units, for generating a virtual seat map, and
wherein the master controller is configured to control operating parameters of the plurality of aircraft passenger service units, in particular to control lighting parameters of the plurality of passenger service units, on the basis of the virtual map of the arrangement of the plurality of aircraft passenger service units and the virtual seat map.

10. An aircraft comprising:
a passenger cabin; and
an aircraft passenger service unit assembly comprising:
a plurality of aircraft passenger service units, wherein each aircraft passenger service unit comprises: at least two near field communication interfaces;
wherein each of the at least two near field communication interfaces is configured for a wireless exchange of messages with a corresponding near field communication interface of a neighboring aircraft passenger service unit; and
wherein the messages include information that identifies the aircraft passenger service unit and the near field communication interface sending the respective message; and
a master controller;
wherein each of the plurality of aircraft passenger service units is coupled to the master controller via its master communication interface;
wherein each of the plurality of aircraft passenger service units is configured to send identification information about itself and identification information about its respective neighboring aircraft passenger service units, which has been obtained by exchanging messages with its respective neighboring aircraft passenger service units, to the master controller; and
wherein the master controller is configured to process said identification information, received from the plurality of aircraft passenger service units, for generating a virtual map of the arrangement of the plurality of aircraft passenger service units, wherein the virtual map indicates spatial positions and/or orientations of the plurality of aircraft passenger service units with respect to each other;
wherein the plurality of aircraft passenger service units of the aircraft passenger service unit assembly are installed within the passenger cabin of the aircraft.

11. A method of determining spatial positions and/or orientations of a plurality of aircraft passenger service units in a passenger cabin of an aircraft, wherein each of the plurality of aircraft passenger service units comprises at least two near field communication interfaces, and wherein the method includes that
neighboring aircraft passenger service units exchange messages with each other in a wireless manner via their respective near field communication interfaces, wherein the messages include information that identifies the aircraft passenger service unit and the near field communication interface sending the respective message;

each of the plurality of aircraft passenger service units transmits identification information about itself and identification information about its neighboring aircraft passenger service units to a master controller; and the master controller processes said identification information, which the master controller received from the plurality of aircraft passenger service units, for generating a virtual map of the arrangement of the aircraft passenger service units, wherein the virtual map indicates the spatial positions and/or orientations of the plurality of aircraft passenger service units with respect to each other.

12. The method according to claim 11, wherein at least a subset of the plurality of aircraft passenger service units are arranged adjacent to each other in a continuous row or chain and/or wherein respective subsets of the plurality of aircraft passenger service units are arranged adjacent to each other in a plurality of continuous rows or chains; and wherein the method further includes that the master controller, pursuant to receiving additional high level arrangement information, determines a spatial position of at least one continuous chain of aircraft passenger service units within the passenger cabin of the aircraft and/or determines spatial positions and/or orientations of at least two continuous chains of aircraft passenger service units with respect to each other.

13. The method according to claim 11, wherein the method further includes that:

each of the plurality of aircraft passenger service units determines a position and/or orientation of at least one passenger seat, which is located in the vicinity of, in particular below, the respective aircraft passenger service unit; and that each of the plurality of aircraft passenger service units transmits passenger seat information about said position and/or orientation of said at least one passenger seat to the master controller.

14. The method according to claim 13, wherein the method further includes that the master controller processes said passenger seat information, received from the plurality of aircraft passenger service units, for generating a virtual seat map, and that the master controller controls operating parameters of the plurality of aircraft passenger service units, in particular lighting parameters of the plurality of passenger service units, on the basis of the virtual map of the arrangement of the plurality of aircraft passenger service units and the virtual seat map.

* * * * *